United States Patent [19]
Schurman, Jr.

[11] 3,824,371
[45] July 16, 1974

[54] GUN TYPE SOLDERING DEVICE WITH IMPROVED SOLDER WIRE FEEDING MECHANISM

[76] Inventor: David B. Schurman, Jr., 98 Morningside Path, East Weymouth, Mass. 02189

[22] Filed: Nov. 1, 1972

[21] Appl. No.: 302,675

[52] U.S. Cl.............. 219/230, 219/235, 226/127, 228/53
[51] Int. Cl. ................... H05b 1/00, B23k 3/06
[58] Field of Search ......... 219/227, 230, 231, 229, 219/235; 228/51–55; 226/127, 128, 157

[56] References Cited
UNITED STATES PATENTS

| | | | |
|---|---|---|---|
| 1,540,859 | 6/1925 | Plicque | 228/53 |
| 2,125,781 | 8/1938 | Harris | 226/127 |
| 2,195,944 | 4/1940 | Stream | 228/53 |
| 2,254,521 | 9/1941 | Gardner | 226/127 |
| 2,432,428 | 12/1947 | Lang | 219/230 UX |
| 2,444,267 | 6/1948 | Pereira | 228/53 |
| 2,875,719 | 3/1959 | Smith | 226/127 |
| 3,068,826 | 12/1962 | Meader et al | 219/230 X |
| 3,219,251 | 11/1965 | Davis | 228/53 |

*Primary Examiner*—A. Bartis
*Attorney, Agent, or Firm*—Cushman, Darby & Cushman

[57] ABSTRACT

An electrical gun-type soldering device having a solder wire feeding mechanism preferably in the form of an attachment, the feeding mechanism including an actuating member having a thumb engaging portion adapted to be selectively disposed in either one of two normally biased inoperative positions in one of which the thumb engaging portion is disposed adjacent the upper left side of the handle portion of the soldering device for convenient engagement by the right thumb of a right-handed operator and in the other of which the thumb engaging portion is disposed adjacent the upper right side of the handle portion for convenient engagement by the left thumb of a left-handed operator. The actuating member is mounted by means of a flexible cable and a surrounding closely wound coil spring for movement from the selected normally biased inoperative position through successive operative cycles each of which includes a downward working stroke by a downward digital pressure of the thumb by the operator on the thumb engaging portion and an upward return stroke of the thumb engaging portion by release of the thumb pressure. The feeding mechanism also includes a pair of cooperating rollers mounted with their peripheries in cooperating relation to drivingly engage therebetween the intermediate portion of a solder wire extending from a supply spool and a ratchet mechanism for effecting an incremental rotational movement of at least one of the rollers in response to an operating cycle of the actuating member.

13 Claims, 4 Drawing Figures

GUN TYPE SOLDERING DEVICE WITH IMPROVED SOLDER WIRE FEEDING MECHANISM This invention relates to soldering devices and more particularly to soldering devices of the gun type and improvements therein for feeding solder wire into operative relation with the working tip of such device.

Soldering devices have been known for many years and the patented literature contains many proposals for providing means on these devices for feeding a solder wire into cooperating relation with the working tip of the device. In recent years soldering devices of the gun type have become quite popular in use. These devices include a housing body providing a depending handle portion shaped to be gripped by a hand of an operator, a working tip extending forwardly from the body and a trigger member disposed in a position to be engaged by the index finger of the operator's hand gripping the handle portion for electrically actuating the working tip. Where devices of this type are used extensively such as in electrical component assembly and the like, the provision of a means for feeding the solder wire into cooperating relation with the working tip of the device constitutes a significant convenience to the operator. However, in order to provide this convenience, the manner in which the mechanism is actuated must likewise be as convenient as possible for the operator. I have found that such convenience is most significantly provided where the operator is enabled to actuate the solder wire feeding mechanism by a downward movement of the thumb of the hand gripping the handle portion of the device. In this way, the operator is not required to shift the trigger actuating index finger to effect the feeding action and actuation can be easily obtained without fatigue over extensive periods of operation. Of course, in addition, by enabling the operator to effect actuation by a downward thumb movement, the other hand of the operator is freed for the purpose of gripping a component to be welded or the like.

Accordingly, it is an object of the present invention to provide a solder wire feeding mechanism having an actuator structure capable of being actuated in the manner indicated above.

Another object of the present invention is to provide a solder wire feeding mechanism of the type described which is capable of being disposed in either one of two locations for accommodating either a right-handed or a left-handed operator. This objective is obtained by providing a mounting structure in the form of a reversible plate and detachably connecting the actuator thereto by means of a cable and a surrounding closely wound coil spring.

Still another object of the present invention is to provide a solder wire feeding mechanism of the type described which can be detachably fixedly secured to conventional commercial gun-type soldering devices as an attachment therefor by providing a mounting structure having U-shaped clips.

Another object of the present invention is to provide a soldering device of the type described having an improved solder wire feeding mechanism providing for maximum convenience in operation by providing a solder feeder housing and solder wire spool having common horizontal upper surfaces enabling the device to be supported in inverted position on a table top or the like.

Another object of the present invention is the provision of a soldering device provided with a solder wire feeding mechanism having improved cooperating roller means for effecting the feeding action of the solder wire in response to actuating by the operator.

A further object of the present invention is to provide a solder wire feeding mechanism which is simple in construction, efficient in operation and economical to manufacture.

These and other objects of the present invention will become more apparent during the course of the following detailed description and appended claims.

The invention may best be understood with reference to the accompanying drawings, wherein an illustrative embodiment is shown.

In the drawings:

FIG. 4 is a fragmentary sectional view taken along the line 4—4 of FIG. 1.

Figure 1:
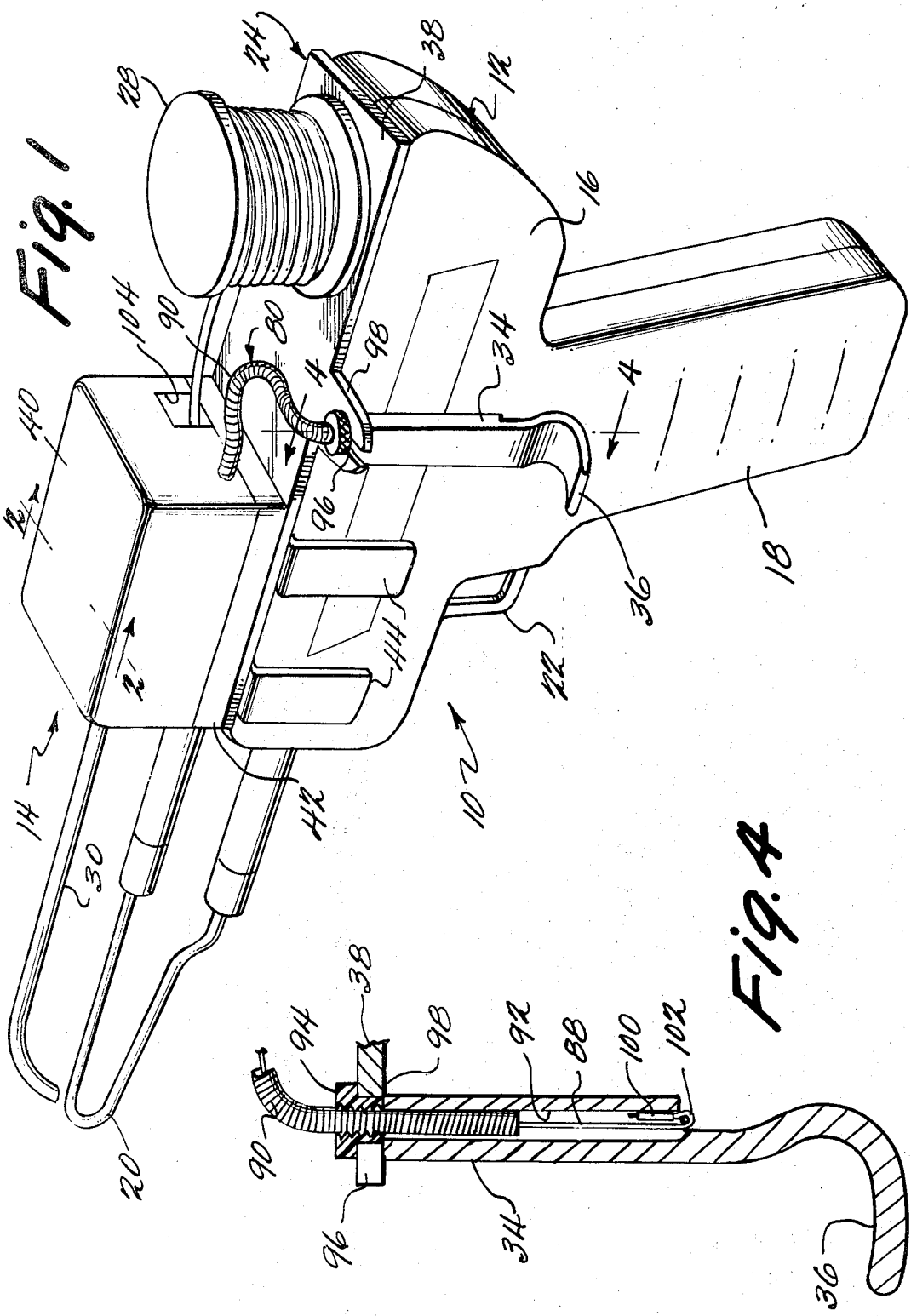
FIG. 1 is a perspective view of a soldering device of the gun type having a solder wire feeding mechanism embodying the principles of the present invention mounted thereon as an attachment therefor.

Referring now more particularly to the drawings, there is shown in FIG. 1 thereof an improved soldering apparatus, generally indicated at 10, embodying the principles of the present invention. The apparatus 10 includes a conventional electrical gun-type soldering device, generally indicated at 12, and a solder wire feeding mechanism attachment, generally indicated at 14. The soldering device 12 includes the usual housing body 16 having a depending handle portion 18 shaped to be gripped by a hand of an operator and a conventional working tip 20 extending forwardly from the body 16. A trigger member 22 is mounted on the housing body 16 in a position to be engaged by the index finger of the operator's s hand gripping the handle portion 18 for electrically actuating the working tip 20, all in accordance with conventional practice. It will be understood that the soldering device 12 may be any of the well-known commercial devices of this type presently on the market.

The present invention is more particularly concerned with the solder wire feeding mechanism attachment 14 and the cooperation thereof with the basic component elements of the device 12. As best shown in FIG. 1, the attachment 14 includes, in general, a mounting structure, generally indicated at 24, adapted to be detachably fixedly secured on the upper portion of the housing body 16 of the soldering device 12. Mounted on the rearward portion of the mounting structure 24 is a spindle assembly, generally indicated at 26 (see FIG. 3), for supporting a spool of solder wire 28 for rotational movement about a generally vertical axis to pay out the solder wire in a direction forwardly thereof. Disposed in forwardly spaced relation to the spool 28 is a guide tube 30 which is carried by the mounting structure 24 and extends forwardly therefrom in outwardly and downwardly curved relation to receive and guide the leading portion of the solder wire extending from the spool 28 along a path such that the leading end of the solder wire extends into cooperating relation with the working tip 20 of the device 12.

Figure 2:
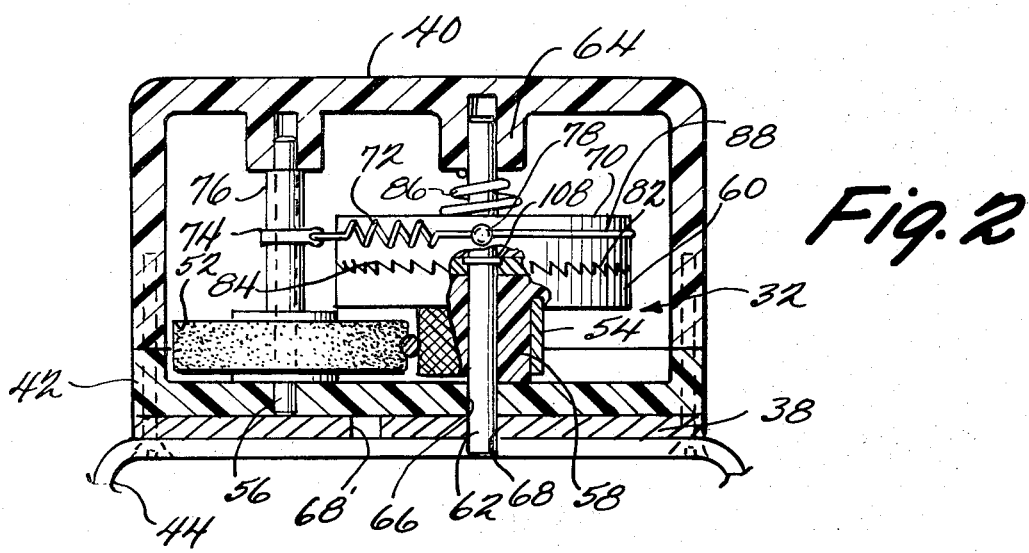
FIG. 2 is a fragmentary sectional view taken along the line 2—2 of FIG. 1.

Disposed between the guide tube 30 and the spool 28 is a solder wire advancing mechanism, generally indicated at 32 and best shown in FIG. 2. The mechanism 32 is adapted to be actuated by an actuating or motion transmitting member 34. The member 34 is carried by the mounting structure 24 in downwardly extending relation along one side of the housing body 16 of the device 12 and has a thumb engaging portion 36 extending outwardly from the lower end thereof in a position to be engaged by the thumb of the hand of the operator gripping the handle portion 18. The actuating member 34 is normally biased into an inoperative position, as shown in FIGS. 1 and 4, and is adapted to be moved from that position in a downward working stroke by a downward digital pressure of the thumb of the operator engaging the upwardly facing surface of the thumb engaging portion 36. Upon release of the thumb pressure, the actuating member moves through an upward return stroke.

The mounting structure 24 may assume any desirable construction and configuration, however, as shown, the mounting structure includes a horizontally extending generally rectangular mounting plate of sheet metal or the like of a size generally conforming to the size of the upper portion of the housing body 16. The mounting structure 24 also preferably includes a housing portion in the form of a pair of upper and lower cooperating housing parts 40 and 42 which are preferably molded of a suitable plastic material, such as nylon or the like. The upper housing part 40 provides an upper surface which is substantially horizontally aligned with the upper surface of the spool 28 so as to serve as a convenient support for the apparatus 10 when disposed in inverted position on a horizontal supporting surface such as a table or the like. The housing parts 40 and 42 also serve to enclose the solder wire advancing mechanism 32 to protect the component elements thereof and to otherwise provide the attachment 14 with a desirable appearance.

Figure 3:
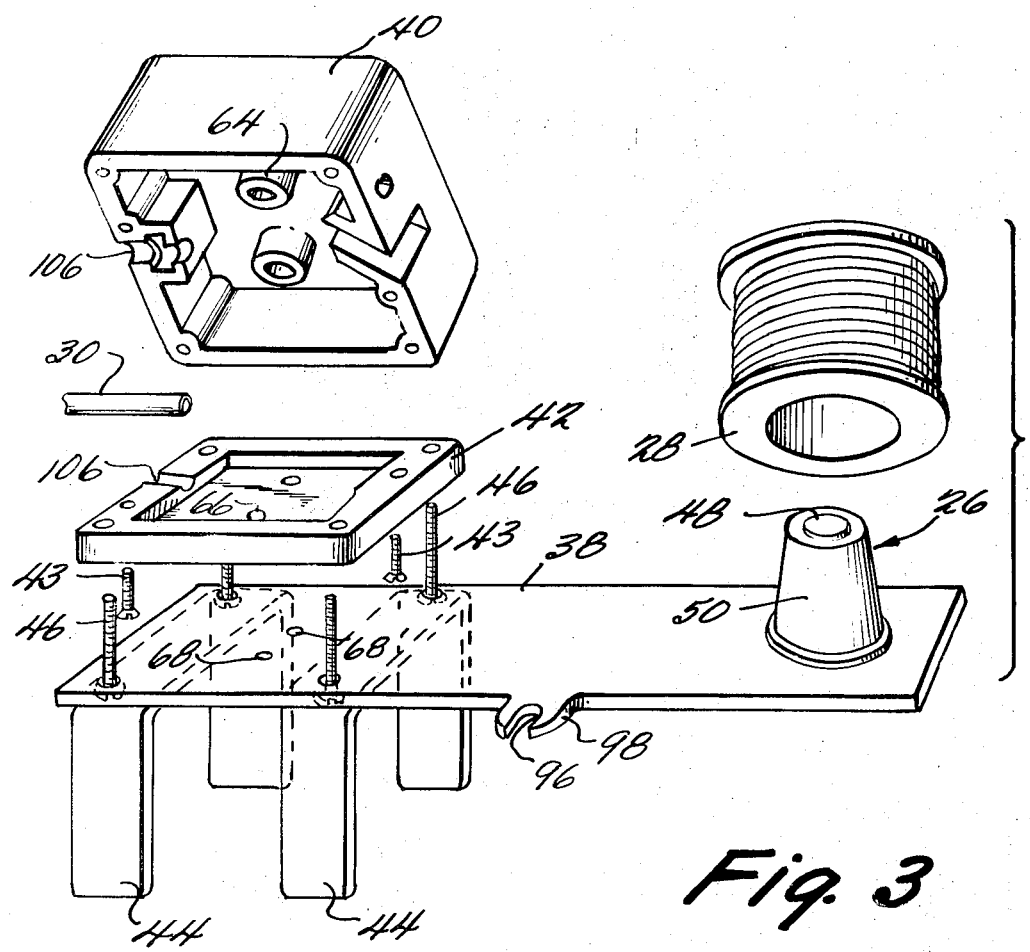
FIG. 3 is an exploded view illustrating certain component parts of the solder wire feeding mechanism shown in FIG. 1.

Any suitable means may be provided for detachably fixedly securing the housing parts 40 and 42 together and to the mounting plate 38 of the mounting structure 24 and for detachably fixedly securing the latter to the housing body 16 of the soldering device 12. In the embodiment shown the housing parts are detachably secured together by a pair of bolts 43 extending upwardly through suitable openings in the lower housing part 42 into engagement within suitable apertured openings in the part 40. As best shown in FIG. 3, the detachable securement of the mounting structure 24 is preferably provided by means of a pair of inverted U-shaped mounting clips 44, having their bight portions disposed beneath the forward portion of the mounting plate 38 and apertured, along with the plate 38, to receive therethrough a series of bolts 46. The bolts 46 also extend through suitable openings in the lower housing part 42 and are threadedly engaged within the upper housing part 40. It will be understood that the depending legs of the inverted U-shaped clips 44 may be covered wih a suitable lining material, such as rubber or the like, to aid in the gripping action and prevent surface damage to the housing body of the soldering device 12, all in accordance with conventional practice.

The spindle assembly 26 may be of any desired construction. The preferred embodiment, as shown, includes a shaft 48 in the form of a headed or flanged shaft or the like having the end thereof opposite from the head internally threaded to receive a bolt or the like fastener (not shown) extending upwardly therein through a countersunk opening (not shown) formed in the mounting plate 38. Rotatably mounted on the shaft 48 is a spindle member 50 which is preferably molded of plastic material to provide an upwardly diverging frustoconical exterior periphery. In this regard it will be noted that the spool 28 is formed with a mating frustoconical interior surface so as to enable the same to be wedgedly engaged on the spindle. The spool is of a size to receive a supply of solder wire in coiled formation about the exterior periphery thereof. It will be understood, however, that rather than providing a spool requiring the supply of solder wire to be wound thereon, the present invention contemplates the utilization of solder wire replacement packages in the form of prewound spools.

Referring now more particularly to FIG. 2, the solder wire advancing mechanism 32 preferably includes a pair of cooperating rollers 52 and 54 rotatably mounted within the housing parts 40 and 42 with their peripheries in cooperating relation to drivingly engage therebetween an intermediate portion of the solder wire extending from the spool 28. In the embodiment shown, the roller 52 includes a peripheral portion of resilient material, such as rubber or the like, and is mounted for rotation about a vertical axis, by means of a shaft 56 suitably journaled at its ends within appropriate openings formed respectively in the upper and lower housing parts 40 and 42.

The roller 54 is preferably in the form of a metal collar having its exterior periphery suitably interrupted, as by knurling or the like. The collar or roller 54 is mounted on a hub portion 58 forming an integral depending part of an annular member 60. The member 60 is molded of plastic material to include circular recess for wedgingly receiving the upper end portion of the collar 54. The roller 54 is rotatably supported by journaling the member 60 on a shaft 62, the upper end of which is journaled within a boss 64 formed in the upper interior of the upper housing part 40 and the lower end of which is journaled through an opening 66 formed in the lower housing part 42. As best shown in FIG. 2, the lower end of the shaft 62 extends downwardly from the opening 66 through a registering opening 68 formed in the mounting plate 38 with the lower extremity protruding below the opening 68 for a purpose to be explained more fully hereinafter.

Mounted on the shaft 62 above the member 60 for oscillatory rotational movement between first and second limiting positions is a driving member 70 which, as shown, is preferably molded of plastic material in a circular configuration. The member 70 is resiliently biased into its first position, by any suitable spring means, such as a coil spring 72. One end of the coil spring 72 is connected to a clip 74 engaged over the central portion of the periphery of a spacer sleeve 76 surrounding the shaft 56 between the roller 52 and the housing part 40. The opposite end of the spring 72 extends around and is connected to a drive screw 78 extending radially into the driving member 70.

The driving member 70 is connected with the actuating member 34 by a suitable motion transmitting mechanism which serves to limit the movement of the member into its first position under the bias of the spring 72 and to permit movement toward its second position in response to the downward working stroke of the actuating member 34. In the preferred embodiment shown, the motion transmitting mechanism is preferably in the form of a bowden wire assembly, generally indicated at 80.

In order to effect incremental movement of the roller 54 in response to the movement of the driving member 70 from its first position toward its second position by the actuating member 34, the member 60 is formed with a series of upwardly facing ratchet teeth 82 arranged in annularly extending relation thereabout. The driving member 70 includes a series of downwardly facing cooperating ratchet teeth 84 similarly arranged in annular relation thereabout. In order to permit a return movement of the driving member 70 in response to the return stroke of the actuating member 34, without any corresponding movement of the roller 54, the driving member 70 is also mounted for axial movement on the shaft 62 between an operative ratchet tooth engaging position, as shown in FIG. 2, and an inoperative ratchet tooth disengaging position. A light spiral spring 86 is mounted in surrounding relation to the shaft 62 between the boss 64 and driving member 70 to resiliently bias the latter into its operative position and to yieldingly permit movement thereof into its inoperative position by the cam action of the ratchet teeth during the movement of the driving member toward its first position under the action of spring 72 when the thumb pressure on the actuating member 34 is released.

The bowden wire assembly 80 includes the usual flexible cable 88 having one end thereof connected with the driving member, as by engagement within the driving member by means of the drive screw 78. The bowden wire assembly 80 also includes the usual tightly wound coil spring guide 90 disposed in surrounding relation to the flexible cable 88 intermediate the ends thereof. As best shown in FIG. 1, one end of the coil spring guide 90 is threadedly engaged within an appropriately formed opening in the rear wall of the housing part 40.

Referring now more particularly to FIG. 4, the opposite end of the flexible cable 88 and coil spring guide 90 are preferably connected with the actuating member 34 in such a way as to resiliently maintain the actuating member in a normally biased inoperative position by the action of the spring 72 and to permit downward movement of the actuating member through its working stroke in a relatively unrestricted or unconfined movement which permits the actuating member to follow the natural downward movement of the thumb of the operator irrespective of differences in the size and shape thereof. To this end, the actuating member 34 is formed with an opening 92 extending downwardly from the upper end thereof of a size to loosely receive therein a free end portion of the coil spring guide 90 of the bowden wire assembly 80. Suitably fixed, as by a threaded connection or the like adjacent this free end portion of the coil spring guide 90 is a retainer in the form of a flanged collar 94. The collar 94 is adapted to engage the circular portion of a keyhole within a slot 96 formed in a laterally extending portion 98 of the mounting plate 38 disposed in a position extending over one side of the housing body 16 of the soldering device 12.

The end of the flexible cable 88 is suitably fixed to the actuating member and, as shown in FIG. 4, this connection is preferably effected by crimping a rigid sleeve 100 on the extremity of the flexible cable 88 extending outwardly of the lower end of the openings 92. The cable is then wrapped around a pin 102 extending across the end of the openings 92 and the sleeve 100 is engaged upwardly into the lower end of the opening 92. In this way, the spring 72 serves to resiliently bias the actuating member upwardly so that its upper surface abuttingly engages the lower surface of the laterally extending portion 98 of the mounting plate 38.

It will be understood that the housing parts 40 and 42 are formed with suitable guide surfaces for directing the portion of the solder wire extending forwardly from the spool 28 into the interior of the housing parts between the rollers 52 and 54, and, as shown, such surfaces are provided by a recess 104 formed in the lower portion of the rear wall of the upper part 40. Likewise, the forward lower portion of the forward wall of the housing part 40 as well as the adjacent portion of the housing part 42, are formed with appropriate recesses 106 (see FIG. 3) which cooperate when the two housing parts are secured together to fixedly secure therebetween the rear end of the solder wire guide tube 30.

OPERATION

The apparatus 10 is adapted to be operated by a single hand of the operator. In the normal operating position, the operator grasps the handle portion 18 of the housing body 16 of the soldering device 12 and places his index finger in engagement with the trigger 22 and his thumb in overlying relation to the thumb engaging portion 36 of the actuating member 34. A working cycle of the solder wire feeding mechanism includes a downward working stroke of the actuating member by the operator pressing down his thumb on the thumb engaging portion 36 and an upward return stroke in which the operator releases the thumb pressure on the thumb engaging portion 36 of the actuating member 34. In the preferred embodiment shown, the actuating member is so mounted that it will follow whatever downward movement is most natural to the particular operator by virtue of the mounting of the actuating member by the flexible cable 88. The cable 88 is sufficiently flexible to permit the actuating member to assume any position as it is moved downwardly but the loose engagement of the free end portion of the coil spring guide 90 serves to stabilize this movement somewhat and to insure that the actuating member will assume its proper inoperative position when released.

When a new supply of solder wire is initially provided, the leading end of the wire is manually paid out from the spool 28 and engaged within the recess 104 until it moves between the cooperating rollers 52 and 54. By successively moving the actuating member 34 through successive operating cycles, the solder wire will be moved between the rollers 52 and intermittently fed forwardly through the guide tube 30 until the leading end thereof is disposed in cooperating relation with the tip 20. This intermittent feeding action takes place during each operating cycle as follows. The downward stroke of the actuating member is transmitted to the driving member 70 through the flexible cable 88 to move the latter from its first position toward its second position against the action of the spring 72. The spring 86, which is considerably lighter than the spring 72, serves to resiliently maintain the ratchet teeth 82 and 84 in engagement during this movement so that the member 60 is moved with the driving member and the driving roller 54 is likewise, in turn, moved with the driving member. The knurled exterior periphery of the roller 54 engages the side of the solder wire and is resiliently held in engagement therewith by the resilient material formed in the peripheral portion of the roller 52 so that the turning movement of the roller 54 will result in a forward movement of the solder wire.

During the return stroke of the actuating member when the operator releases the thumb pressure, the frictional engagement of the rollers 52 and 54 with the solder wire, as well as the frictional engagement of the solder wire within the guide tube 30 and the other frictional forces acting on the solder wire, will resist turning movement of the rollers 52 and 54 in the opposite direction. The strength of the spring 86 is chosen to be substantially less than the frictional forces involved when taken in conjunction with the slope of the ratchet teeth so that during the return stroke of the actuating member the driving member is cammed upwardly until it is returned to its first position which is limited by the engagement of the upper end of the actuating member 34 with the lower surface of the portion 98 and flange collar 94. In this way, the rollers are intermittently rotated in a direction to advance the solder wire only during the working stroke of the actuating member.

It will be understood that in the normal working operation of the apparatus, the operator can move the actuating member downwardly through a working stroke which corresponds in length to the desired amount of solder needed to complete the particular joint being worked upon. The maximum extent of the working stroke is preferably less than a 90° movement of the driving member. In this regard, it will be noted that the head of the driving screw 78 will engage the side wall of the housing part 40 to limit the extent of the working stroke. This limit insures that the extremity of the flexible cable engaged within the driving member 70 by the drive screw 78 will not be flexed during operation.

In accordance with the principles of the present invention, the actuating member 34 is carried by the mounting structure 24 so that it can be selectively disposed in either one of two normally biased inoperative positions. One of these positions is illustrated in FIG. 1 in which the thumb engaging portion 36 is disposed adjacent the upper left side of the handle portion 18 of the soldering device 12 for convenient engagement by the right thumb of a right-handed operator. In the other of these positions, the thumb engaging portion 36 is disposed adjacent the upper right side of the handle portion of the device for convenient engagement by the left thumb of a left-handed operator. While it is within the contemplation of the present invention to provide two laterally extending portions 98 to effect this selective mounting, it is preferable to provide such selection by simply reversing the mounting plate in side-to-side relation. Thus, in order to dispose the actuating member 34 in the second position to accommodate a left-handed operator, the bolts 46 are loosened from the housing part 40 and removed, freeing the housing parts from securement to the mounting plate 38 with the housing parts being retained together by the bolts 43. The actuating member 34 is released from supported relation by the plate 38 simply by moving the retainer 94 upwardly out of the keyhole slot 96 against the spring pressure acting on the portion 98 and then moving the guide 90 laterally outwardly of the slot 96. Finally, the spindle assembly 26 is removed from the mounting plate leaving the same in a condition to be simply reversed in side-to-side relation. After reversal, the parts are assembled in their normal position and in this regard, it will be noted that the plate 38 is provided with a second opening 68' for receiving the shaft 62 when the plate is reversed.

The extension of the shaft 62 downwardly through the opening 68 (or 68') provides the feed mechanism with a means for disengaging the ratchet teeth in the event that it should become desirable to withdraw the solder wire from engagement between the rollers 52 and 54. To effect this operation, the attachment is first removed from the device 12. As can be clearly seen in FIG. 2, the shaft 62 has an intermediate portion of its periphery grooved to receive a spring clip 108 which is positioned beneath the lower surface of the driving member 70. Thus, when the protruding lower end of the shaft 62 is now exposed by disengaging the attachment from the soldering device, a manual inward movement on the exposed end of the shaft 62 will serve to effect an axial movement of the driving member 40 into its inoperative disengaged position by virtue of the engagement of the clip 108 therewith against the action of the light spring 86.

It can thus be seen that there has been provided a solder wire feeding attachment for a conventional electrical gun-type soldering device which will provide maximum convenience during operation. It will also be apparent that while the feeding mechanism is preferably disclosed in the form of an attachment, it could readily be incorporated as an integral part of the device during manufacture thereof.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. For use with a soldering device of the electrical gun type including a housing body providing a depending handle portion shaped to be gripped by a hand of an operator in pistol grip fashion, a working tip extending forwardly from said body and a trigger member disposed in a position to be engaged by the index finger of the operator's hand gripping the handle portion for actuating the working tip, an attachment for carrying a spool of solder wire and for feeding said solder wire into cooperating relation with the working tip of said device, said attachment comprising a mounting structure, means for detachably fixedly securing said mounting structure on the upper portion of said housing body, means on the rear portion of said mounting structure for supporting a spool of solder wire for rotational movement to pay out the solder wire in a direction forwardly thereof, means extending forwardly from said mounting structure for guiding the leading portion of the solder wire extending from the spool along a path such that the leading end of the solder wire extends into cooperating relation with the working tip of the device, movement responsive means carried by said mounting structure between said spool supporting means and said solder wire guiding means operable through successive operative cycles each including a working stroke and a return stroke for effecting successive incremental forward movements of the solder wire by engagement therewith intermediate the portion thereof on said spool and the leading portion thereof within said guide means, a movement effecting member including a portion having upwardly facing surface means to be engaged beneath the thumb of the hand of an operator gripping said handle portion as aforesaid, and means for mounting said movement effecting member on said mounting structure for (1) selective disposition in either one of two normally biased inoperative positions in one of which said thumb engaging portion is disposed adjacent the upper left side of the handle portion of the device for convenient engagement beneath the right thumb of a right-handed operator and in the other of which said thumb engaging portion is disposed adjacent the upper right side of the handle portion of the device for convenient engagement beneath the left thumb of a left-handed operator and (2) movement from the selected normally biased inoperative position through successive operative cycles each of which includes a downward working stroke of said thumb engaging portion by downward digital pressure of the thumb of the operator and an upward return stroke of said thumb engaging portion by release of said thumb pressure and said mounting means further connecting said movement effecting member in motion transmitting relation with said movement responsive means for effecting movement of the latter through successive operative cycles in response to the movement of said movement effecting member through successive operative cycles.

2. An attachment as defined in claim 1 wherein said movement responsive means including a housing portion on said mounting structure, said housing portion including an upwardly facing exterior surface disposed within a generally horizontal plane, a spool of solder supported on said spool supporting means for rotation about a vertical axis, said spool having an upwardly facing exterior end surface disposed within the aforesaid horizontal plane.

3. For use with a soldering device of the electrical gun type including a housing body providing a depending handle portion shaped to be gripped by a hand of an operator, a working tip extending forwardly from said body and a trigger member disposed in a position to be engaged by the index finger of the operator's hand gripping the handle portion for actuating the working tip, an attachment for carrying a reel of solder wire and for feeding said solder wire into cooperating relation with the working top of said device, said attachment comprising a mounting structure, means for detachably fixedly securing said mounting structure on the upper portion of said housing body, means on the rear portion of said mounting structure for supporting a spool of solder wire for rotational movement to pay out the solder wire in a direction forwardly thereof, means extending forwardly from said mounting structure for guiding the leading portion of the solder wire extending from the spool along a path such that the leading end of the solder wire extending into cooperating relation with the working tip of the device, movement responsive means carried by said mounting structure between said spool supporting means and said solder wire guiding means operable through successive operative cycles each including a working stroke and a return stroke for effecting successive incremental forward movements of the solder wire by engagement therewith intermediate the portion thereof on said spool and the leading portion thereof within said guide means, a movement effecting member including a portion shaped to be engaged by a thumb of an operator, and means mounting said movement effecting member in cooperating relation with said mounting structure and connecting the same in motion transmitting relation with said movement responsive means for (1) selective disposition in either one of two normally biased inoperative positions in one of which said thumb engaging portion is disposed adjacent the upper left side of the handle portion of the device for convenient engagement by the right thumb of a right-handed operator and in the other of which said thumb engaging portion is disposed adjacent the upper right side of the handle portion of the device for convenient engagement by the left thumb of a left-handed operator and (2) movement from the selected normally biased inoperative position through successive operative cycles each of which includes a downward working stroke of said thumb engaging portion by downward digital pressure of the thumb of the operator and an upward return stroke of said thumb engaging portion by release of said thumb pressure, said movement effecting member mounting means including a flexible cable connected at one end to said movement effecting member and at its opposite end to said movement responsive means and a tightly wound coil spring guide surrounding said cable intermediate the ends of the latter, said guide having a free end portion disposed within an opening in said movement effecting member and the remaining portion thereof operative fixed at spaced positions with respect to said mounting structure.

4. An attachment as defined in claim 3 including a collar member fixedly engaged over said guide adjacent said free end portion, said mounting structure including a portion extending over one side of the housing body of the device having a slot extending laterally therein of a size to receive said guide laterally therethrough, said collar member being engaged with said slotted portion, said movement effecting member abutting said slotted portion when in said selected normally biased inoperative position.

5. An attachment as defined in claim 4 wherein said mounting structure includes a housing portion enclosing said movement responsive means, the end of said guide being fixedly engaged within said housing portion.

6. An attachment as defined in claim 5 wherein said mounting structure includes a mounting plate separate from said housing portion having said slotted portion extending from one side thereof and means detachably securing said mounting plate for side-to-side reversal with respect to said housing portion to effect the selective disposition of said movement effecting member into either of said two normally biased inoperative positions.

7. An attachment as defined in claim 5 wherein said movement responsive means comprises a pair of cooperating rollers rotatably mounted within said housing portion with their peripheries in cooperating relation to drivingly engage therebetween the intermediate portion of the solder wire extending from the spool, a driving member mounted in said housing portion for movement between first and second positions, spring means for resiliently biasing said driving member into said first position, the opposite end of said flexible cable being connected with said driving member, and ratchet means between said driving member and one of said rollers operable in response to the movement of said driving member from said first position toward said second position by said flexible cable in response to the downward working stroke of said thumb engaging portion for incrementally rotating said one roller in a direction to feed the solder wire engaged thereby forwardly.

8. An attachment as defined in claim 7 wherein said one roller includes a knurled periphery and the other roller includes a peripheral portion formed of resilient material.

9. For use with a soldering device of the electrical gun type including a housing body providing a depending handle portion shaped to be gripped by the hand of an operator and a working tip extending forwardly from said body, an attachment for carrying a spool of solder wire and for feeding said solder wire into cooperating relation with the working tip of said device, said attachment comprising a mounting structure, means for detachably fixedly securing said mounting structure on the upper portion of said housing body, means on the rear portion of said mounting structure for supporting a spool of solder wire for rotational movement to pay out the solder wire in a direction forwardly thereof, said mounting structure including a housing portion spaced forwardly of said spool mounting means, a pair of cooperating rollers rotatably mounted within said housing portion with their peripheries in cooperating relation to drivingly engage therebetween an intermediate portion of the solder wire extending from the spool, said pair of rollers each including a peripheral portion, one of said peripheral portions being knurled, means extending forwardly from said housing portion for guiding the leading portion of the solder wire extending from the spool along a path such that the leading end of the solder wire extends into cooperating relation with the working tip of the device, a vertically extending shaft journaled in said housing portion, a circular driving member mounted in said housing portion on said shaft for oscillatory rotational movement between first and second positions, first spring means for resiliently biasing said driving member into said first position, means carried by said mounting structure in a position to be engaged by the hand of the operator gripping the handle portion of the device for effecting movement of said driving member toward said second position against the action of said spring means, ratchet means between said driving member and one of said rollers operable in response to a cycle of movement of said driving member from said first position toward said second position and then back into said first position for incrementally rotating said one roller, only in a direction to feed the solder wire engaged thereby forwardly, only during movement of said driving member in one direction, said ratchet means including a first series of downwardly facing ratchet teeth arranged annularly on said driving member, a circular ratchet member fixed with respect to said one roller and having a second series of upwardly facing cooperating ratchet teeth arranged annularly thereabout, said one roller being rotatably mounted on said shaft, said driving member being axially movable on said shaft between an operative position wherein said first and second series of ratchet teeth are interengaged and an inoperative position wherein said first and second series of ratchet teeth are disengaged, and second spring means resisiently biasing said driving member into said operative position.

10. An attachment as defined in claim 9 wherein said shaft includes a lower end portion extending outwardly of said housing portion in a position to be manually engaged when said attachment is detached from the soldering device to effect an axial movement of said shaft, said shaft having abutment means thereon operable to move said driving member into the inoperative position thereof in response to the aforesaid axial movement thereof.

11. An attachment as defined in claim 9 wherein said driving member movement effecting means comprises a flexible cable having one end fixedly connected to the periphery of said driving member, a movement effecting member disposed in upwardly abutting relation to said mounting structure fixedly connected to the opposite end of said flexible cable, and a tightly wound coil spring guide surrounding said cable between said housing portion and said movement effecting member, said movement effecting member extending downwardly along one side of the housing body of the soldering device and having a thumb engaging portion extending outwardly from the lower end thereof.

12. In a soldering device of the electrical gun type including a housing body providing a depending handle portion shaped to be gripped by a hand of an operator in pistol grip fashion, a working tip extending forwardly from said body and a trigger member disposed in a position to be engaged by the index finger of the operator's hand gripping the handle portion for actuating the working tip, the improvement in combination therewith which comprises a solder wire feeding mechanism comprising means carried by the housing body for supporting a spool of solder wire for rotational movement to pay out the solder wire in a direction forwardly thereof, means carried by said housing body extending forwardly of said spool supporting means for guiding the leading portion of the solder wire extending from the spool along a path such that the leading end of the solder wire extends into cooperating relation with the working tip of the device, movement responsive means carried by said housing body between said spool supporting means and said solder wire guiding means operable through successive operative cycles each including a working stroke and a return stroke for effecting successive incremental forward movements of the solder wire by engagement therewith intermediate the portion thereof on said spool and the leading portion thereof within said guiding means, a movement effecting member including a portion having upwardly facing surface means to be engaged beneath the thumb of the hand of an operator gripping said handle portion as aforesaid, and means for mounting said movement effecting member on said housing body for (1) selective disposition in either one of two normally biased inoperative positions in one of which said thumb engaging portion is disposed adjacent the upper left side of the handle portion of the device for convenient engagement beneath the right thumb of a right-handed operator and in the other of which said thumb engaging portion is disposed adjacent the upper right side of the handle portion of the device for convenient engagement beneath the left thumb of a left-handed operator and (2) movement from the selected normally biased inoperative position through successive operative cycles each of which includes a downward working stroke of said thumb engaging portion by downward digital pressure of the thumb of the operator and an upward return stroke of said thumb engaging portion by release of said thumb pressure and said mounting means further connecting said movement effecting member in motion transmitting relation with said movement responsive means for effecting movement of the latter through successive operative cycles in response to the movement of said movement effecting member through successive operative cycles.

13. The improvement as defined in claim 12 wherein said movement responsive means comprises a pair of cooperating rollers rotatably carried by said housing body with their peripheries in cooperating relation to drivingly engage therebetween the intermediate portion of the solder wire extending from the spool, a driving member carried by said housing body for movement by said movement effecting member from a first into a second position, spring means for resiliently biasing said driving member into said first position, and ratchet means between said driving member and one of said rollers operable in response to the movement of said driving member from said first position toward said second position in response to the downward working stroke of said thumb engaging portion for incrementally rotating said one roller in a direction to feed the solder wire engaged thereby forwardly.

* * * * *